United States Patent
Sanchez et al.

(10) Patent No.: US 11,085,885 B2
(45) Date of Patent: Aug. 10, 2021

(54) PIPE JOINT INSPECTION

(71) Applicant: Aegion Coating Services, LLC, Chesterfield, MO (US)

(72) Inventors: Renato Sanchez, Broken Arrow, OK (US); Darrell Davis, Broken Arrow, OK (US); Stephen Sears, Broken Arrow, OK (US); Kirk Schmitz, Tulsa, OK (US); Udaykiran Rokkam, Broken Arrow, OK (US)

(73) Assignee: Aegion Coating Services, LLC, Conroe, TX (US)

( * ) Notice: Subject to any disclaimer, the term of this patent is extended or adjusted under 35 U.S.C. 154(b) by 284 days.

(21) Appl. No.: 15/875,466

(22) Filed: Jan. 19, 2018

(65) Prior Publication Data
US 2018/0202944 A1 Jul. 19, 2018

Related U.S. Application Data

(60) Provisional application No. 62/448,160, filed on Jan. 19, 2017.

(51) Int. Cl.
*G01N 21/954* (2006.01)
*G01B 11/24* (2006.01)
(Continued)

(52) U.S. Cl.
CPC ........ *G01N 21/954* (2013.01); *B05D 3/002* (2013.01); *B05D 7/222* (2013.01); *B23K 31/125* (2013.01);
(Continued)

(58) Field of Classification Search
CPC .. B05D 7/222; B23K 2101/10; B23K 31/125; G01N 2021/9542; G01N 2021/9548; G01N 21/954
See application file for complete search history.

(56) References Cited

U.S. PATENT DOCUMENTS

| | | | | |
|---|---|---|---|---|
| 3,289,468 A | * | 12/1966 | Van Der Veer | G01N 29/27 73/637 |
| 3,691,385 A | * | 9/1972 | Ketchbaw | G03B 37/005 378/60 |
| 3,761,186 A | * | 9/1973 | Wason | G01N 21/954 356/241.1 |
| 4,137,779 A | * | 2/1979 | Wustenberg | G01N 29/2487 73/627 |

(Continued)

FOREIGN PATENT DOCUMENTS

| | | | |
|---|---|---|---|
| JP | H10115605 A | | 5/1998 |
| JP | 2002-62281 | * | 2/2002 |

(Continued)

OTHER PUBLICATIONS

Adler, "Machine Design—Case 37: Weld Holidays Cause Leakage Problem," 2016, Reliability Engineering Snapshot, pp. 1-2.*

(Continued)

*Primary Examiner* — John Fitzgerald
(74) *Attorney, Agent, or Firm* — Stinson LLP (57) ABSTRACT

A system for inspecting an interior surface of a girth weld region of a pipeline includes a robot that includes a scanner mounted on a carriage for scanning the interior surface of the girth weld region to generate surface profile data. A profile analyzer receives the surface profile data and outputs an indication of whether the interior surface of the girth weld region is suitable for being coated. In some embodiments, an imaging system captures images of the girth weld region as it is being scanned. In a method of coating the girth weld regions of a pipeline, the images of a girth weld region found to be unsuitable for being coated based on the scanning data are used to certify whether the girth weld region is suitable for being coated.

24 Claims, 10 Drawing Sheets

(51) Int. Cl.
  *B05D 3/00* (2006.01)
  *B05D 7/22* (2006.01)
  *B23K 31/12* (2006.01)
  *B23K 101/10* (2006.01)

(52) U.S. Cl.
  CPC .......... *G01B 11/24* (2013.01); *B23K 2101/10* (2018.08); *G01N 2021/9542* (2013.01); *G01N 2021/9548* (2013.01)

(56) References Cited

U.S. PATENT DOCUMENTS

| | | | | |
|---|---|---|---|---|
| 4,213,183 A * | 7/1980 | Barron | G01N 29/226 | 702/39 |
| 4,299,128 A * | 11/1981 | Gruber | G01N 29/07 | 73/627 |
| 4,395,911 A * | 8/1983 | Macecek | G01N 29/07 | 73/615 |
| 4,434,660 A * | 3/1984 | Michaels | G01N 29/265 | 73/619 |
| 4,506,549 A | 3/1985 | Thome | | |
| 4,785,667 A * | 11/1988 | Miyajima | G01N 29/0645 | 73/618 |
| 4,851,773 A * | 7/1989 | Rothstein | G01B 7/281 | 324/220 |
| 5,005,420 A * | 4/1991 | Miyajima | G01N 29/0618 | 73/620 |
| 5,285,689 A | 2/1994 | Hapstack et al. | | |
| 5,392,652 A * | 2/1995 | Levesque | G01N 29/043 | 73/629 |
| 5,497,662 A * | 3/1996 | Dykes | G01N 29/043 | 73/598 |
| 5,565,633 A * | 10/1996 | Wernicke | G01N 27/82 | 324/220 |
| 5,602,885 A * | 2/1997 | Ahmed | G21C 17/06 | 376/248 |
| 5,996,711 A * | 12/1999 | Ohmer | E21B 7/061 | 175/61 |
| 6,137,897 A * | 10/2000 | Emi | G06F 16/58 | 382/128 |
| 6,352,147 B1 * | 3/2002 | Orlamunder | F16D 13/64 | 192/107 R |
| 7,460,980 B2 * | 12/2008 | Hinn | G01M 3/005 | 324/220 |
| 7,900,516 B2 * | 3/2011 | Fukutomi | G01N 29/069 | 73/598 |
| 8,051,717 B2 * | 11/2011 | Fukutomi | G01N 29/069 | 73/598 |
| 8,633,713 B2 * | 1/2014 | Langley | G01N 27/24 | 324/600 |
| 8,788,219 B2 * | 7/2014 | Fingerhut | G06T 7/0004 | 702/38 |
| 8,800,396 B2 | 8/2014 | Langley et al. | | |
| 9,739,721 B2 * | 8/2017 | Gutierrez Perez | G01N 17/04 | |
| 9,927,354 B1 * | 3/2018 | Starr | G01S 13/867 | |
| 10,480,862 B2 * | 11/2019 | Rajagopalan | F28F 3/02 | |
| 10,613,059 B2 * | 4/2020 | Fetzer | G01N 29/28 | |
| 10,695,876 B2 * | 6/2020 | Rajagopalan | B23K 9/173 | |
| 10,937,144 B2 * | 3/2021 | Starr | G06T 7/0004 | |
| 10,942,522 B2 * | 3/2021 | Loosararian | B60B 19/006 | |
| 2001/0002462 A1 * | 5/2001 | Kosuge | G01B 11/024 | 702/167 |
| 2001/0052264 A1 * | 12/2001 | Johnson | B23K 31/125 | 73/628 |
| 2003/0200809 A1 * | 10/2003 | Hatanaka | G01N 29/043 | 73/600 |
| 2006/0230831 A1 * | 10/2006 | Berke | G01N 29/0645 | 73/602 |
| 2006/0288756 A1 * | 12/2006 | De Meurechy | G01N 17/006 | 73/1.01 |
| 2007/0276552 A1 * | 11/2007 | Rodocker | B62D 57/00 | 701/2 |
| 2008/0021662 A1 * | 1/2008 | Hinn | G01M 3/005 | 702/34 |
| 2008/0251612 A1 * | 10/2008 | Rodriguez-Amaya | F02M 57/023 | 239/585.1 |
| 2009/0199642 A1 * | 8/2009 | Fukutomi | G01N 29/069 | 73/598 |
| 2009/0308163 A1 * | 12/2009 | Fukutomi | G01N 29/0609 | 73/598 |
| 2010/0046576 A1 * | 2/2010 | Desai | G01N 29/2487 | 374/119 |
| 2010/0131210 A1 * | 5/2010 | Fingerhut | G01N 27/90 | 702/38 |
| 2010/0212385 A1 * | 8/2010 | Marshall | B23Q 39/044 | 72/80 |
| 2010/0307249 A1 * | 12/2010 | Lesage | G01N 29/0645 | 73/623 |
| 2012/0069172 A1 * | 3/2012 | Hudritsch | H04N 5/23238 | 348/84 |
| 2012/0226159 A1 * | 9/2012 | Sinclair | G01S 7/52046 | 600/443 |
| 2012/0230579 A1 * | 9/2012 | Oikawa | G01N 21/954 | 382/152 |
| 2012/0256643 A1 | 10/2012 | Langley et al. | | |
| 2012/0257042 A1 * | 10/2012 | McKaigue | G01N 21/954 | 348/84 |
| 2013/0014598 A1 | 1/2013 | Langley et al. | | |
| 2013/0041597 A1 * | 2/2013 | Deleye | G01B 17/02 | 702/39 |
| 2013/0118260 A1 * | 5/2013 | Cawley | G01N 29/069 | 73/632 |
| 2013/0192334 A1 * | 8/2013 | S | G01N 29/30 | 73/1.82 |
| 2014/0081594 A1 * | 3/2014 | Tunheim | G01N 21/31 | 702/150 |
| 2014/0196662 A1 * | 7/2014 | Prieto | B05B 13/0618 | 118/708 |
| 2014/0230620 A1 * | 8/2014 | Bucks | B26D 1/36 | 83/403 |
| 2014/0238136 A1 * | 8/2014 | Ten Grotenhuis | G01N 29/11 | 73/592 |
| 2014/0260705 A1 | 9/2014 | Kimpel, Jr. et al. | | |
| 2015/0160167 A1 * | 6/2015 | Kawasaki | G01N 29/069 | 73/598 |
| 2016/0109414 A1 * | 4/2016 | Cawley | G01N 29/069 | 73/632 |
| 2016/0230285 A1 * | 8/2016 | Yamamoto | C23C 18/1683 | |
| 2016/0320266 A1 * | 11/2016 | Kimpel, Jr. | G01B 21/08 | |
| 2017/0182605 A1 * | 6/2017 | Rajagopalan | B23K 9/32 | |
| 2017/0234838 A1 * | 8/2017 | Ten Grotenhuis | G01N 29/225 | 702/56 |
| 2018/0001422 A1 * | 1/2018 | Rajagopalan | B23K 26/044 | |
| 2018/0029154 A1 * | 2/2018 | Rajagopalan | B23K 9/0282 | |
| 2018/0080904 A1 * | 3/2018 | Al Nahwi | F16L 1/265 | |
| 2018/0080905 A1 * | 3/2018 | Al Nahwi | B63C 11/42 | |
| 2018/0088043 A1 * | 3/2018 | Starr | G01S 13/86 | |
| 2018/0089896 A1 * | 3/2018 | Starr | G06T 11/00 | |
| 2018/0117718 A1 * | 5/2018 | Rajagopalan | B23K 37/0531 | |
| 2018/0136169 A1 * | 5/2018 | Ume | G01N 29/34 | |
| 2018/0188215 A1 * | 7/2018 | Fetzer | G01N 29/225 | |
| 2018/0249061 A1 * | 8/2018 | Olsson | H04N 5/23203 | |
| 2018/0284796 A1 * | 10/2018 | Loosararian | B60B 19/006 | |
| 2019/0339233 A1 * | 11/2019 | Paul | G01N 29/30 | |

FOREIGN PATENT DOCUMENTS

WO  WO2012167380 A1  12/2012
WO  WO 2017124194 A1 *  7/2017

OTHER PUBLICATIONS

Cross et al., "Delta technique extends the capabilities of weld quality assurance," Dec. 1969, British Journal of N.D.T., pp. 62-77.*
Chivavibul et al., "Development of a Multi-Beam Laser Ultrasonic Inspection System and Its Application of Flaw Sizing," Aug. 2006, Central Research Institute of Electrical Power Industry.*

(56) References Cited

OTHER PUBLICATIONS

The AccuProfile 820 Datasheet by Acuity Laser (Year: 2013).*
AccuProfile 820 Laser Scanner User's Manual (Year: 2017).*
OMS Measure, Optical Metrology Services Ltd, © 2014 Measure, http://www.omsmeasure.com/news/news-categories/pipeline-welds-seen-measured-quantified-and-appproved#23; 4 pgs.
OMS Measure, Optical Metrology Services Ltd, © 2014 Measure, http://www.omsmeasure.com/auga-internal-weld-inspection-tool, 4 pgs.
OMS Measure, Optical Metrology Services Ltd, © 2014 Measure, http://www.omsmeasure.com/weld-inspection/, 4 pgs.
Huber, Aaron and Sokolov, Mikhail, Diakont, San Diego, CA, USA, Pipeline Pigging and Integrity management Conference, Marriott Westchase Hotel, Houston, TX, USA, Feb. 12-13, 2014, Robotic In-line Inspection of Pipeline Girth Welds for Fitness for Service Assessments, 9 pgs.
Subsea7, New Technology on Aasta Hansteen Deepwater Pipeline and Catenary Risers, Apr. 10, 2014 presentation, www.subsea7.com, 26 pgs.
International Search Report of related application PCT/US2018/014468 dated Jun. 22, 2018, 3 pages.
Written Opinion related application PCT/US2018/014468 dated Jun. 22, 2018, 12 pages.

* cited by examiner

PIPE JOINT INSPECTION

CROSS-REFERENCE TO RELATED APPLICATION

This application claims priority to U.S. Provisional Patent Application Ser. No. 62/448,160, entitled PIPE JOINT INSPECTION, which is hereby incorporated by reference in its entirety.

FIELD

The present disclosure relates to a robot for inspecting weld joints between pipes in a pipeline and, more specifically, to a robot for determining whether an interior surface of a girth weld region is suitable for being coated.

BACKGROUND

Pipelines are often formed from segments of pipes that are welded together and internally coated with, for example, fusion bonded epoxy (FBE), liquid epoxy, cladding, clad coatings, etc., to prevent corrosion. Intermediate segments of each pipe are coated at the factory, and end segments of the pipe are left uncoated for welding in the field. The pipes are delivered to the field and welded together to form the pipeline. The uncoated end segments of the pipes are subsequently coated using an internal pipe coating robot. But occasionally, the welding process can create defects in the surface of the uncoated portion of the pipe that render it unsuitable for being coated.

SUMMARY

In one aspect, a system for inspecting an interior surface of a girth weld region between two pipes of a pipeline comprises a robot comprising a carriage configured for being received in the pipeline for movement along the pipeline. A scanner is mounted on the carriage and configured for scanning the interior surface of the girth weld region when the carriage is operatively aligned with the girth weld region and to generate surface profile data representative of a profile of the interior surface of the girth weld region. A profile analyzer is configured to receive the surface profile data and to output an indication of whether the interior surface of the girth weld region is suitable for being coated based on the surface profile data.

In another aspect, a method of evaluating whether the interior surface of a girth weld region of a pipeline is suitable for being coated comprises positioning a robot comprising a scanner inside the pipeline at the girth weld region. The girth weld region is scanned using the scanner to generate surface profile data representative of a profile of the interior surface of the girth weld region. Whether the surface profile data indicates that the interior surface of the girth weld region includes a defect that may affect whether the girth weld region is suitable for being coated is determined. An indication of whether the surface profile data indicates that the profile of the interior surface of the girth weld region includes a defect that may affect whether the girth weld region is suitable for being coating is provided.

In still another aspect, a method of coating interior surfaces of a plurality of girth weld regions of a pipeline comprises, for each girth weld region, receiving an indication based on surface profile data generated by scanning the interior surface of the girth weld region using a scanner of an inspection robot. The indication is one of a group of indications consisting of: a suitability indication indicating that the interior surface of the girth weld is suitable for being coated and a non-suitability indication indicating that the interior surface of the girth weld may not be suitable for being coated. For each girth weld region for which the suitability indication is received, the interior surface of the girth weld region is coated. For each girth weld region for which the non-suitability indication is received, an image of the girth weld region generated by a camera of the inspection robot is evaluated to certify the interior surface of the girth weld region is one of suitable for being coated and not suitable for being coated. For each girth weld region certified as suitable for being coated, the interior surface of the girth weld region is coated. For each girth weld region certified as not suitable for being coated, the girth weld region is repaired.

Other aspects and features will be apparent and/or pointed out hereinafter.

BRIEF DESCRIPTION THE DRAWINGS

Corresponding reference characters indicate corresponding parts throughout the drawings.

DETAILED DESCRIPTION

Figure 1:
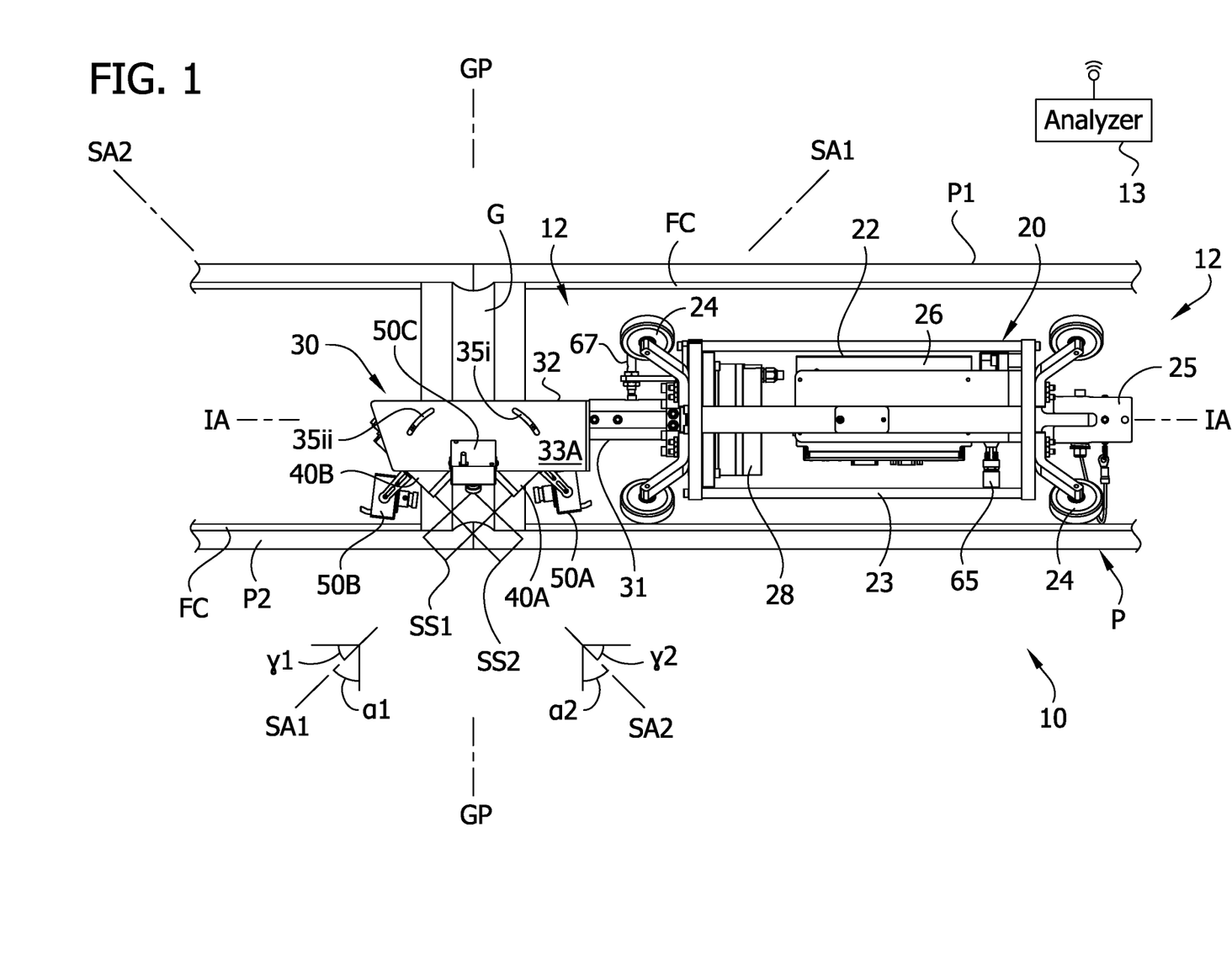
FIG. 1 is an elevation of an inspection robot of an inspection system situated in a pipeline shown in section and includes an analyzer of the inspection system illustrated schematically.

Referring to FIG. 1, an inspection system for inspecting the interior surface of a girth weld region G is shown received in a pipeline P in operative alignment with the girth weld and generally indicated at reference number 10. As is known in the art, the pipeline P includes a plurality of pipes, including first and second pipes P1, P2, which are arranged end-to-end and welded together at girth welds G (also known as field joints) that extend generally in a girth weld plane GP oriented substantially perpendicular to the pipeline. Before being welded together, intermediate segments of the interior surfaces of the pipes P1, P2 are coated with a factory-applied coating FC (e.g., a factory-applied FBE coating), but the end segments of the pipes are uncoated to allow them to be welded together in the field. After the pipes P1, P2 are welded together at the girth weld G, the uncoated end segments of the pipes define an uncoated interior surface of girth weld region that must be subsequently coated to provide corrosion resistance along the entire length of the pipeline P. As explained below, the inspection system includes a robot, generally indicated at 12, which is configured to generate data representative of a surface profile of the interior surface of the girth weld region G, and a profile analyzer 13 configured to analyze the profile data and evaluate whether the surface is suitable for being coated before a coating is applied. As an example, in some cases, if a pit in a weld surface has a depth that is greater than the diameter of the opening or greater than one-half of the thickness of the coating to be applied, the surface of the weld may not be suitable for accepting a coating. Weld profiles that define sharp edges or points may also be unsuitable for being coated.

The inspection robot 12 includes a carriage 20 configured for being received in the pipeline P for movement along the pipeline. The illustrated carriage 20 comprises a frame 23 and rollers 24 mounted on the frame for rolling along the interior surface of the pipeline P to guide movement of the robot 12 through the pipeline. In the illustrated embodiment, the carriage 20 includes a clevis 25 configured for connecting the robot 12 to a robot coating chain (not shown) that includes a drive robot for driving movement of the carriage 20 through the pipe. A suitable drive robot and robot coating chain is described in U.S. Pat. No. 8,800,396, which is hereby incorporated by reference in its entirety. In other embodiments, the robot 12 can be driven by a local drive system that is supported on the carriage.

The carriage 12 supports an inspection drive system 22 configured to drive rotation of an inspection head, generally indicated at 30, as described more fully below. In the illustrated embodiment, the drive system 22 comprises a servo drive unit 26 and a rotary servo actuator 28. Suitable servo drive units and rotary servo actuators are available from Harmonic Drive of Peabody, Mass., but other inspection robots can use other drive systems without departing from the scope of the invention.

The inspection head 30 is mounted on an end portion of the carriage 20 opposite the clevis 25 for rotation about an inspection axis IA. When the robot 12 is operatively aligned with the girth weld G, the inspection axis IA is suitably oriented substantially perpendicular to the girth weld plane GP. As will be explained below, the inspection head 30 is equipped with various sensors that are oriented to sense the interior surface of the pipeline P. The inspection head 30 is configured to rotate about the inspection axis IA so that the sensors sense the entire circumference of the interior surface of the pipeline P along a short axial segment of the pipeline. More specifically, when the robot 12 is operatively aligned with the girth weld G, the inspection head 30 is configured to revolve the sensors about the inspection axis IA for sensing the interior surface of the girth weld region around the entire circumference of the pipeline P. In the illustrated embodiment, a shaft 31 of the inspection head 30 is operatively received in an output end of the servo actuator 28 to mount the inspection head on the carriage 20. An adjustment frame 32 is mounted on the free end of the shaft 31 and configured for selectively adjusting the orientation of various sensors on the inspection head 30.

Figure 2:
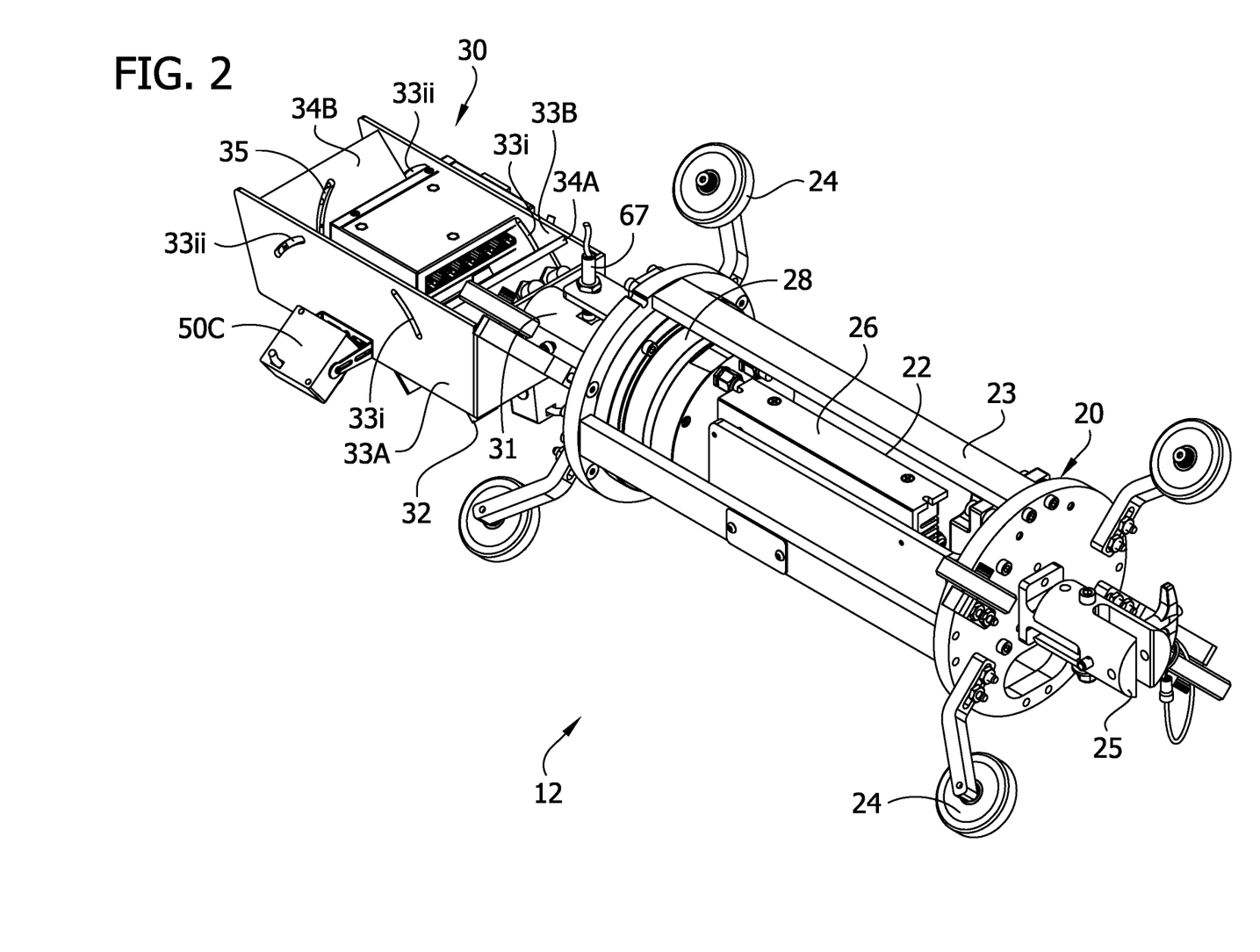
FIG. 2 is a perspective of the inspection robot.
Figure 3:
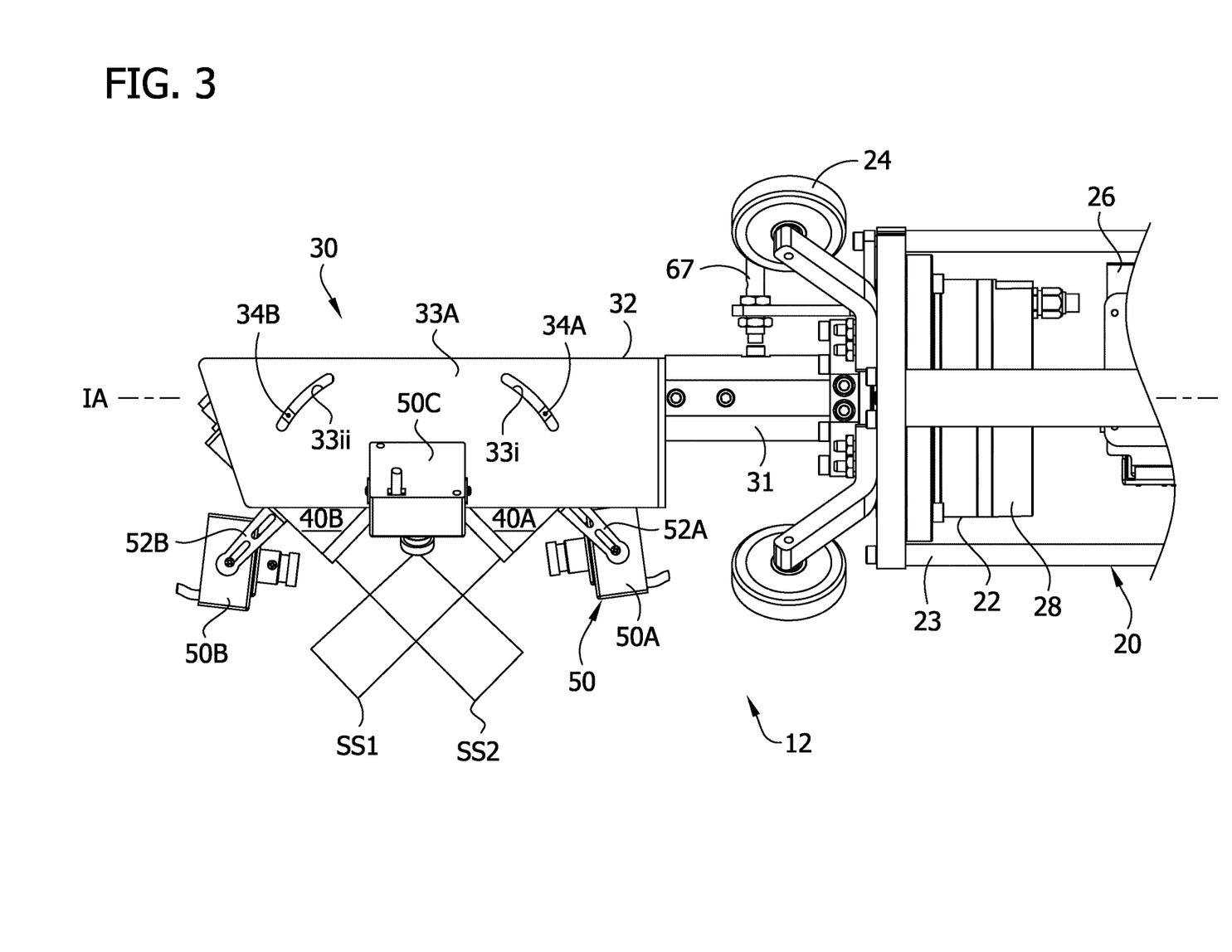
FIG. 3 is an enlarged fragmentary elevation of the inspection robot.
Figure 4:
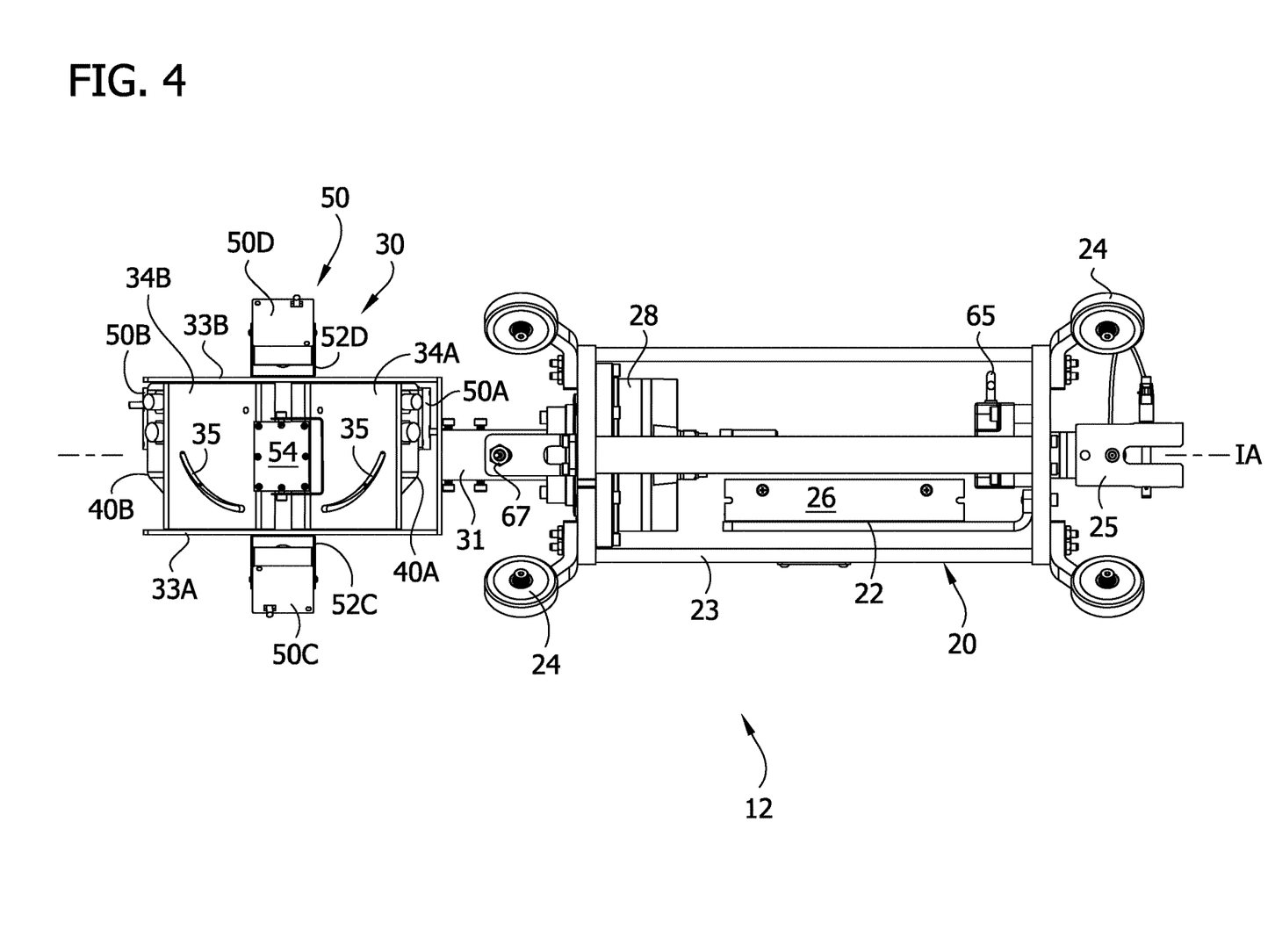
FIG. 4 is a top plan view of the inspection robot.

Referring to FIGS. 2-4, the adjustment frame 32 includes first and second side plates 33A, 33B and first and second adjustment plates 34A, 34B received between the side plates. The side plates 33A, 33B are oriented substantially parallel to one another and the inspection axis IA. Each side plate 33A, 33B defines first and second arcuate adjustment slots 33i, 33ii. The first adjustment slots 33i are generally aligned on opposite sides of the inspection axis IA, and the second adjustment slots 33ii are likewise generally aligned on opposite sides of the inspection axis and curve in the opposite direction from the first adjustment slots. Each adjustment plate 34A, 34B also defines an arcuate adjustment slot 35 for adjusting the orientation of a sensor as described in further detail below. The first adjustment plate 34A is pivotably mounted between the side plates 33A, 33B and includes pins that are slidably received in the arcuate adjustment slots 33i for guiding pivoting movement of the adjustment plate with respect to the side plates. Likewise, the second adjustment plate 34B is pivotably mounted between the side plates 33A, 33B and includes pins that are slidably received in the arcuate adjustment slots 33ii for guiding pivoting movement of the adjustment plate with respect to the side plates. In general, each adjustment plate 34A, 34B is inclined in an opposite direction with respect to the inspection axis IA. The pins of the adjustment plates 34A, 34B slide through the respective slots 33i, 33ii as the end plates are pivoted to adjust the respective angle of incline.

First and second object scanners 40A, 40B are mounted on the inspection head 30 for scanning the interior surface of the girth weld region G to detect a surface profile thereof. More specifically, the first scanner 40A is mounted on one side of the first adjustment plate 34A, and the second scanner 40B is mounted on one side of the second adjustment plate 34B. Each scanner 40A, 40B is configured to transmit a scanning signal SS1, SS2 toward the girth weld G along a respective scanning axis SA1, SA2 (FIG. 1) and to receive a reflected surface profile signal from the interior surface of the girth weld region representative of the surface profile (e.g., a topography or shape of the surface). In the illustrated embodiment, each scanner 40A, 40B comprises a two dimensional laser scanner, such as a non-contact two-dimensional laser scanner sold by Acuity Industries, Inc., of Portland, Oreg. Other types of scanners (e.g., ultrasonic, infrared, three-dimensional laser scanners, etc.) may also be used without departing from the scope of the invention. In one or more embodiments, the scanners 40A, 40B are configured to scan the interior surface of the girth weld region G at a scanning resolution of at least 50 readings-per-circumferential-inch of the girth weld (e.g., the scanners are configured to generate two-dimensional profile data for the girth weld region at least once every 0.020 circumferential-inches, at least once every 0.017 inches, at least once every 0.008 inches, etc.) as the drive system 22 rotates the inspection head 30 about the inspection axis IA. The laser scanners 40A, 40B produce heat when generating the scanning signals SS1, SS2. Thus, it is desirable for the robot 12 to include cooling jackets or heat sinks (broadly, cooling devices) that are operatively connected to the laser scanners 40A, 40B for cooling the laser scanners in use.

As the scanners scan the interior surface of the girth weld region G, they generate respective surface profile data. The surface profile data includes an indication of the size and shape of the surface of the girth weld region G that is exposed on the interior of the pipeline P at a plurality of circumferentially spaced locations. The surface profile data contains measurements of the dimensions of the weld profile at a plurality of circumferential positions around the weld G. Thus, the profile data includes measurements that can provide indications of discontinuities, voids, cracks, holidays, spatter, or other defects that are exposed on the interior surface of the girth weld region G and can adversely affect the ability of the girth weld to accept a coating. The first scanner 40A generates first surface profile data representative of the profile of the interior surface of the girth weld region G taken from the vantage of the first scanner, and the second scanner 40B generates second surface profile data representative of the profile of the interior surface of the girth weld region taken from the vantage of the second scanner. In this way, the first and second scanners 40A, 40B simultaneously scan the interior surface of the girth weld region G at first and second scanning orientations to provide comprehensive data about the surface profile of the girth weld. The high resolution profile data measured from two different scanning orientations provides detailed information about the interior surface of the weld region G to evaluate whether it is suitable for being coated. In the illustrated embodiment, the robot is 12 is wirelessly connected to the analyzer 13 for transmitting the first and second surface profile data to the analyzer. In other embodiments, the robot could transmit the surface profile data to the analyzer over another communications medium such as a wired connection.

In FIG. 1, the robot 10 is shown positioned in the pipeline P in operative alignment with the girth weld G. In this position, each of the scanners 40A, 40B is positioned adjacent an opposite side of the girth weld G. The scanners 40A, 40B have angled orientations that direct the scanning signals SS1, SS2 radially outwardly and in axially toward one another. More specifically, the scanners 40A, 40B are configured to generate scanning signals SS1, SS2 that extend radially outward and toward one another to intersect one another at a point of intersection adjacent the girth weld G. The first scanner 40A is oriented at a first scanning angle α1 with respect to the girth weld plane GP (measured as the included angle between the scanning axis SA1 and the girth weld plane) and a first scanning angle γ1 with respect to the inspection axis IA (measured as the included angle between the scanning axis and the inspection axis). The second scanner 40B is oriented at a second scanning angle α2 with respect to the girth weld plane GP and a second scanning angle γ2 with respect to the inspection axis IA. In certain embodiments, the first scanner 40A is oriented at a first scanning angle α1 with respect to the girth weld plane GP in a range of from about 10° to about 80° and a first scanning angle γ1 with respect to the inspection axis IA in a range of from about 80° to about 10°. Similarly, the second scanner 40B is oriented at a second scanning angle α2 with respect to the girth weld plane GP in a range of between 10° to about 80° and a second scanning angle γ2 with respect to the inspection axis IA in a range of between 80° to about 10°.

To properly align the scanning signals SS1, SS2 with the radial position of the girth weld G, the scanning angles α1, α2, γ1, γ2 are selectively adjustable by pivoting the adjustment plates 34A, 34B through respective ranges of motion delimited by the respective adjustment slots 33i, 33ii of the side plates 33A, 33B. In the illustrated embodiment, at a first end of each range of motion of the adjustment plates 34A, 34B, the scanner 40A, 40B has a scanning angle α1, α2 with respect to the girth weld plane GP of about 60° and has a scanning angle γ1, γ2 with respect to the inspection axis IA of about 30°. At a second end of the range of motion, each of the scanners 40A, 40B has a scanning angle α1, α2 with respect to the girth weld plane GP of about 30° and has a scanning angle γ1, γ2 with respect to the inspection axis IA of about 60°. Thus, by pivoting the adjustment plates 34A, 34B to the desired position in their respective ranges of motion, the user can selectively adjust the scanning angle α1, α2 with respect to the girth weld plane GP to any angle in an adjustment range extending from about 30° to about 60° and can selectively adjust the scanning angle γ1, γ2 with respect to the inspection axis IA to any angle in an adjustment range extending from of about 60° to about 30°.

The orientations of the scanners 40A, 40B are further adjustable by adjusting the position of the scanner with respect to its mounting plate 34A, 34B. A mounting pin of each scanner 40A, 40B is slidably received in each of the adjustment slots 35 to mount the scanner on the respective adjustment plate 34A, 34B. The mounting pins can slide through the adjustment slots 35 to adjust the orientation of the scanners 40A, 40B. As the mounting pins slide through the adjustment slots 35, the scanners 40A, 40B pivot about an axis oriented perpendicular to the respective adjustment plate 34A, 34B and the orientations of the scanning axes SA1, SA2 with respect to the inspection axis IA and the girth weld plane GP are adjusted. The positions of the scanners 40A, 40B may be adjusted using the adjustment slots 35 to, for example, align the lasers to compensate for any offset due to manufacturing tolerances.

Referring to FIGS. 3 and 4, the robot 12 further includes an image recording system 50 for transmitting images of the interior surface of the girth weld region G to the analyzer 13. As explained below, analyzer 13 is configured to associate surface profile data from the scanners 40A, 40B at a circumferential location with the recorded images of a corresponding circumferential segment of the girth weld region G to allow for visual inspection of any errors that are detected based on the surface profile data. In the illustrated embodiment, the image recording system includes four video cameras 50A-50D. First and second pivot brackets 52A, 52B pivotably mount first and second video cameras 50A, 50B on the radially outboard side of a respective scanner 40A, 40B. Similarly, third and fourth pivot brackets 52C, 52D pivotably mount third and fourth video cameras 50C, 50D on a respective side plate 33A, 33B of the inspection head 30. The brackets 52A, 52B mount the first and second video cameras 50A, 50C at respective angles to face toward one another along the inspection axis and radially outward to capture images of respective areas of the interior of the pipeline P. The brackets 52C, 52D likewise mount the third and fourth video cameras 50C, 50D at respective angles to face toward one another along an axis perpendicular to the inspection axis IA and radially outward to capture images of respective areas of the interior of the pipeline P.

Suitably, the cameras 50A-50D are oriented to capture images of about the same or substantially similar segments of the pipeline P at the same time, but do so from different vantages to reproduce a substantially complete visualization of the surface profile of the area. Moreover, when the inspection robot is using the scanners 40A, 40B to sense the surface profile of the girth weld region G, the cameras 50A-50D are suitably oriented to capture images of areas that are the same or substantially similar to the areas that are being scanned by the scanners. Suitably, the pivot brackets 52A-52D are configured for selective pivoting adjustment of the orientations of the cameras 50A-50D to generally align the cameras for capturing images of the same or substantially similar segments of the pipeline P that are being scanned by the profile scanners 40A, 40B. In the illustrated embodiment, the image recording system 50 also includes a light fixture 54 that is mounted on the inspection head 30 to shine light on the areas of the interior of the pipeline P that are being recorded by the cameras 50A-50B.

As the inspection head 30 rotates about the inspection axis IA, the robot 12 is configured to simultaneously transmit the surface profile data from the scanners 40A, 40B and the image data (e.g., photographs or video) from cameras 50A-50D to the analyzer 13. The analyzer 13 is configured to correlate the surface profile data with the image data so that a user may selectively view images of the interior surface of the girth weld G at areas where defects are detected in the surface profile data. Because the imaging system 50 provides images of the interior surface of the girth weld G from four different vantage points, the user is provided a comprehensive picture of the surface profile of the weld.

The illustrated robot 12 is configured to automatically begin scanning the circumference of girth weld G at a circumferential position that is aligned with the top of the girth weld G. The robot 12 includes an inclinometer 65 mounted on the carriage 20 that is configured to determine the circumferential position of the top of the pipeline P. In addition, the robot 12 includes a proximity switch 67 configured to determine the circumferential orientation of the inspection head 30 with respect to the carriage 20. Before scanning each girth weld G, the inspection head 30 is rotated to be oriented toward the top of the pipeline so that each weld scan has the same circumferential starting point.

Figure 5:
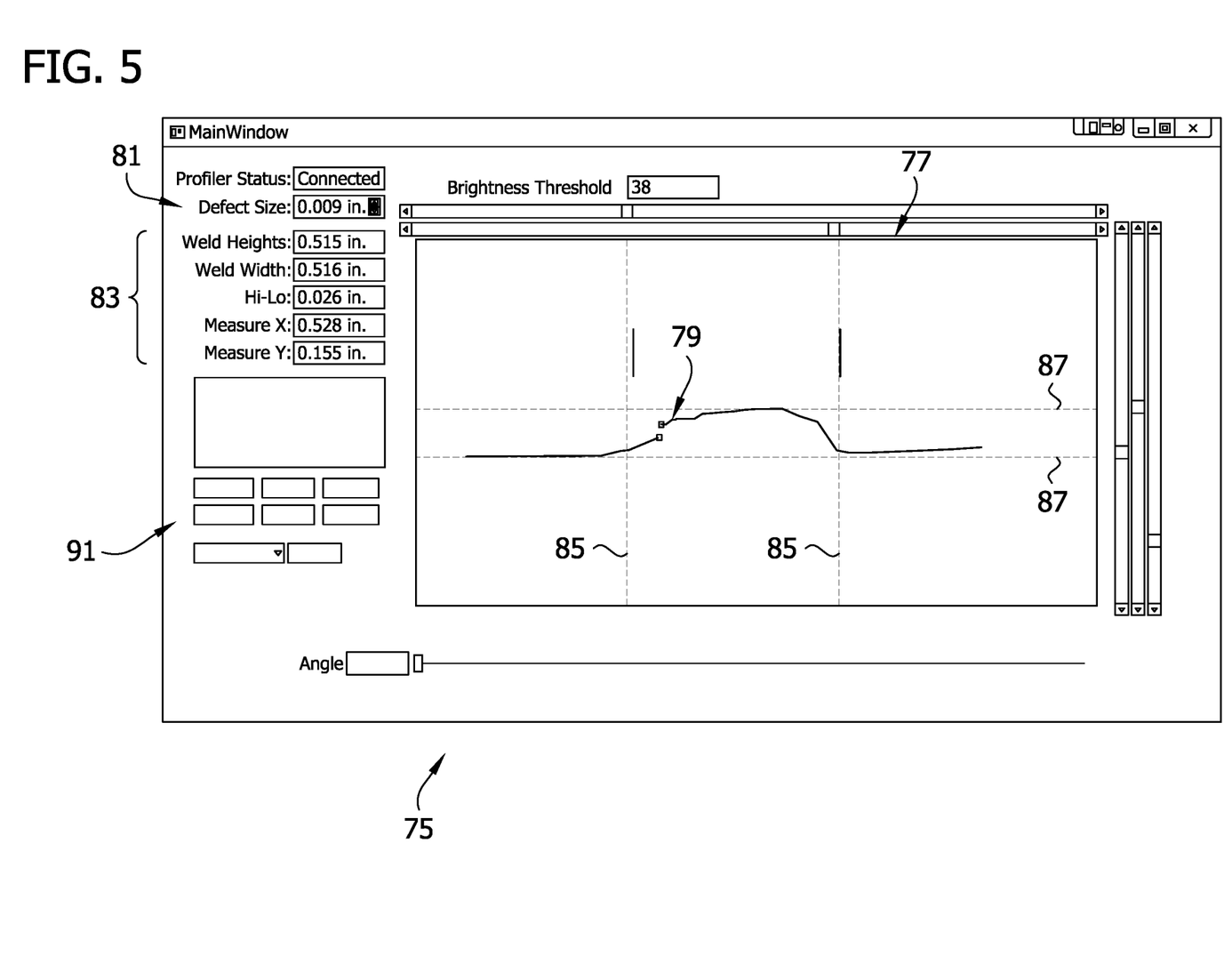
FIG. 5 is a screenshot of a user interface of the analyzer.

Referring to FIG. 5, the analyzer 13 is operatively connected to a display (not shown) to generate a user interface 75 that is displayed on the display for providing a graphic indication of the first and second surface profile data to a user. The illustrated analyzer 13 is configured to selectively display a profile cross-section graphic 77 of each circumferential position at which the weld profile was scanned using the first scanner 40A and to simultaneously display a second identical display (not shown) of the scan performed at the same circumferential position by the second scanner 40B. For example, the graphic 77 for the first scanner 40A can be displayed on one display screen and the graphic for the second scanner 40B could be displayed simultaneously on another, adjacent display screen or the graphics could be simultaneously displayed on different portions of the same display screen, one above the other, side-by-side, etc. Within each profile cross-section graphic 77, the analyzer 13 is configured to present flags 79 that indicate locations where the analyzer has identified defects in the profile of the weld region G that may adversely affect its suitability for receiving a coating. Thus, the analyzer 13 uses the flags 79 to provide indications of whether the interior surface of the girth weld region G is suitable for being coated. In the illustrated embodiment, the user interface 75 includes a defect size configuration field 81 where a user can selectively set the size of defects that the analyzer 13 identifies using the flags 79. The user interface 75 also includes measurement fields 83 for presenting various measurements of the cross-section of the weld depicted in the respective cross-section graphic 77. In the illustrated embodiment, for each graphic 77, the analyzer 13 automatically populates weld width and height fields 83 and includes adjustable measurement fields for selectively measuring a widthwise portion of the weld cross section by graphically adjusting the position of width measurement lines 85 and a height-wise portion of the weld cross section by graphically adjusting the position of height measurement lines 87. In one or more embodiments, the user can select the cross-section graphic 77 or another navigational item and the analyzer 13 will automatically display images of the girth weld G captured by the cameras 50A-50D at the location of the portion of the profile that is currently presented in the display 75. The illustrated user interface 75 also includes system control objects 91 that can be graphically selected to control scanning operations performed by the robot 12.

A method of using the inspection system 10 to determine whether the interior surface of the girth weld region G is suitable for receiving a coating will now be briefly described. Initially, the robot 12 is positioned in the pipeline P and a wireless communication link is established between the robot and the analyzer 13. In the illustrated embodiment, the inspection robot 12 is operatively connected to a crawler robot (not shown), which drives the inspection robot along the length of the pipeline P to operatively align to the robot with the girth weld G. The robot 12 can be configured to automatically detect the location of the girth weld G or the user can monitor real time video from the cameras 50A-50B and control the crawler to properly position the inspection robot 12.

When the inspection robot 12 is operatively aligned with the girth weld G, the user activates the inspection head 30 using the control objects 91 of the user interface 75. The drive system 22 drives rotation of the head 30 about the inspection axis IA. As the head 30 rotates, the scanners 40A, 40B revolve about the axis IA and scan the profile of the interior surface of the girth weld region G about its entire circumference. The first scanner 40A wirelessly transmits first surface profile data to the analyzer 13 the second scanner 40B transmits second surface profile data the analyzer. Simultaneously, the cameras 50A-50D capture images of the girth weld G and wirelessly transmit the image data to the analyzer 13. The crawler operatively aligns the robot 12 with each additional girth weld G of the pipeline P, and the robot repeats the steps of scanning and imaging for each weld.

For each weld, the analyzer 13 may analyze in real time the first and second surface profile data and the image data and generate the surface profile graphics 77 and error flags 79 for detected defects in the surface profile. In one embodiment, for each error flag 79, the user reviews the corresponding image data to determine whether corrective action is necessary before coating the respective girth weld G. For example, the user evaluates the image data and certifies that the girth weld region G must be repaired before being coated (i.e., is not suitable for being coated) or certifies that the girth weld region is actually suitable for being coated based on the image data. For girth weld regions that are certified as not being suitable for coating, corrective action can include, for example, abrading, polishing, filling, smoothing, or otherwise repairing the interior surface of the flagged girth weld region G. After certifying that corrective action is needed for one or more welds G, the user takes the necessary corrective action and rescans the weld to determine if the weld is now suitable for receiving a coating. When all of the girth welds G in the pipeline P are suitable for receiving a coating, the user inserts a coating robot (not shown) into the pipeline and coats the interior surface of each girth weld region.

Figure 6:
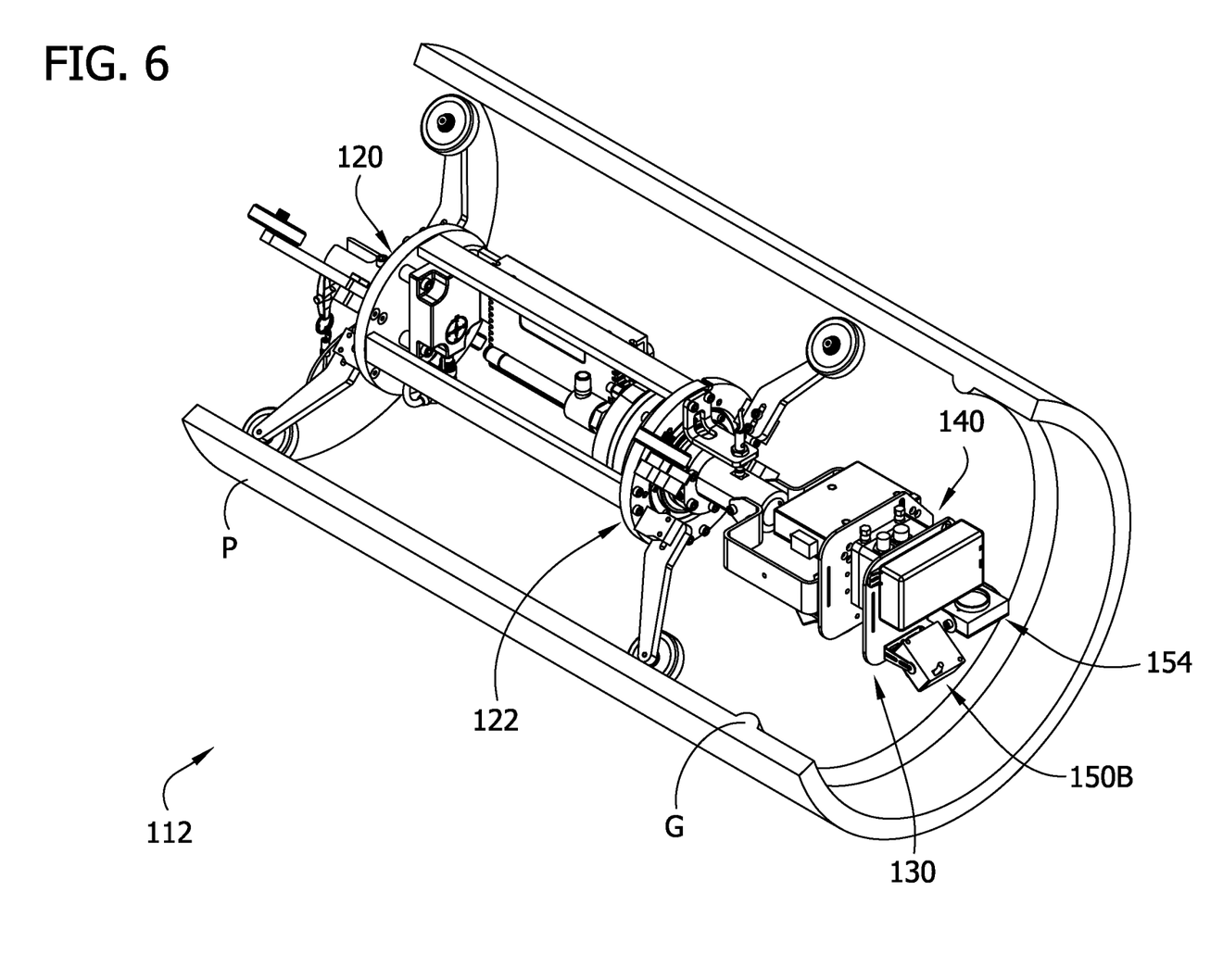
FIG. 6 is a perspective of a pipeline with a portion broken away to reveal another inspection robot received in the pipeline.
Figure 7:
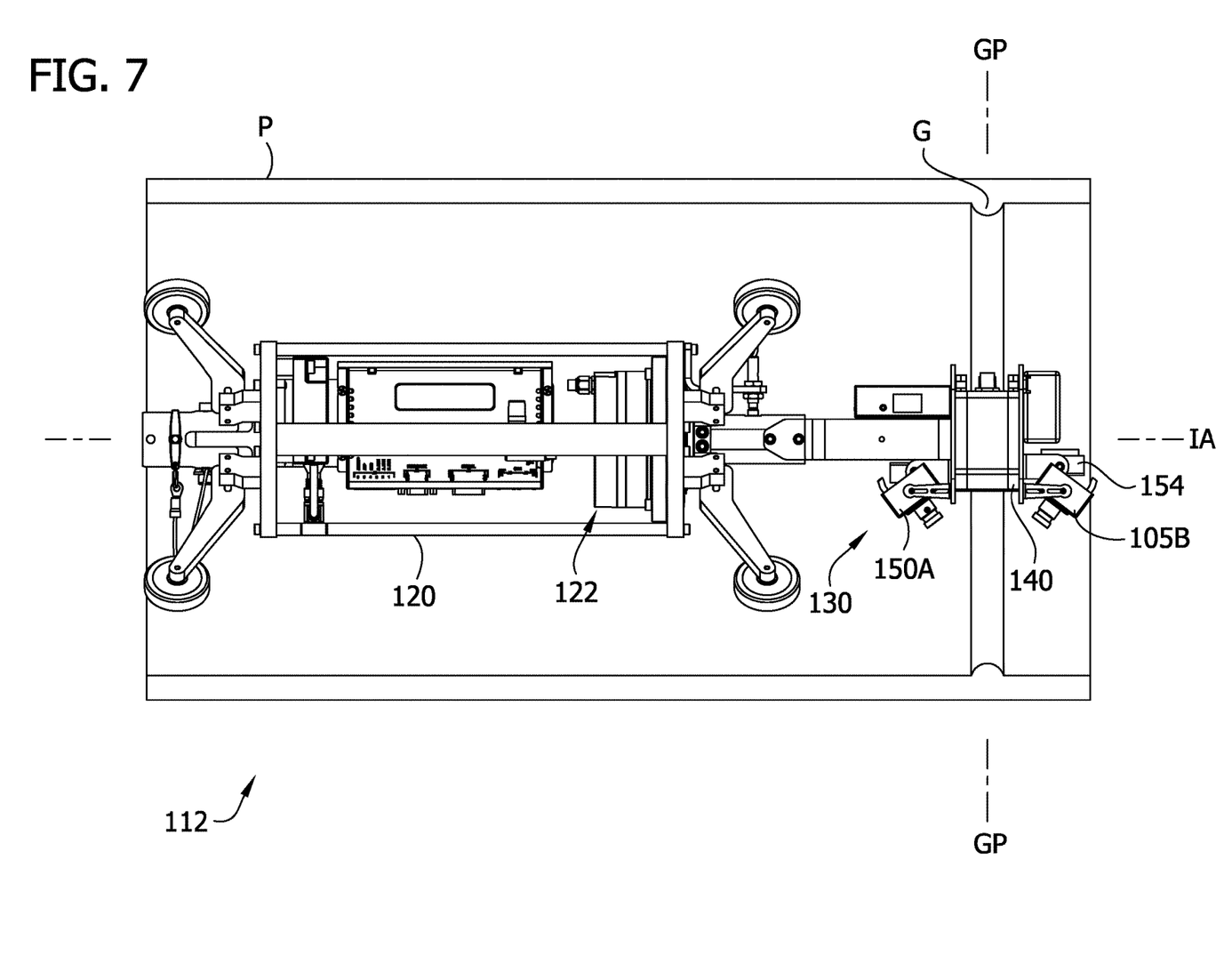
FIG. 7 is an elevation of the inspection robot of FIG. 6 received in the pipeline shown in section.

Referring to FIGS. 6 and 7, another embodiment of an inspection robot is generally indicated at reference number 112. The inspection robot 112 is substantially similar to the inspection robot 12. Like the robot 12, the inspection robot 112 includes a carriage 120 for movement through a pipeline P and an inspection head 130 mounted on the carriage for rotation about an inspection axis IA. The carriage 120 includes a drive system 122 for driving rotation of the inspection head 130 about the inspection axis IA. Unlike the robot 12, the robot 112 includes only a single scanner 140 and two cameras 150A, 150B that are mounted on the inspection head 130. Still other numbers of scanners and cameras can be used in other embodiments. Like the robot 12, the robot 112 includes a light fixture 154 configured for directing light toward the imaged portion of the pipeline P to illuminate the images captured by the cameras 150A, 150B.

In use, the inspection robot 112 operates in much the same manner as the inspection robot 12. In one embodiment, like the inspection robot 12, the inspection robot 112 is configured to scan and capture images of the girth weld region G while rotating the inspection head 130 one revolution. Thus, the inspection robot 112 can scan the girth weld region G at a single orientation of the scanner 140 and provide surface profile data generated at the single orientation of the scanner to the analyzer 13 for evaluating the girth weld region for defects that may affect whether the interior surface of the girth weld region can accept a coating.

In other embodiments, the inspection robot 112 is configured to scan each girth weld G at least two times using the same scanner 140 in different orientations. In one embodiment, the inspection robot 112 includes an adjustable scanner mount and actuators (not shown) configured to selectively adjust the angle of the scanner with respect to the inspection axis IA sand the girth weld plane GP. To scan the girth weld G, the robot 112 positions itself in operative alignment with the girth weld and rotates the inspection head 30 about the inspection axis IA while the scanner is oriented at a first orientation with respect to the inspection axis and the plane GP of the girth weld. Then, the robot 112 adjusts the orientation of the scanner 140 to have a second orientation that is different from the first orientation and scans the girth weld G a second time. In one or more embodiments, the first orientation of the scanner 140 is comparable to the orientation of the first scanner 40A of the robot 12 as shown in FIG. 1 and the second orientation of the scanner is comparable to the orientation of the second scanner 40B as shown in FIG. 1. Thus, in addition to adjusting the orientation of the scanner 140 between first and second scanning operations, the method can include adjusting the position of the robot 112 so that during the first scanning operation the scanner is positioned adjacent a first side of the girth weld G and during the second scanning operation the scanner is positioned adjacent a second side of the girth weld. Accordingly, the single-scanner inspection robot 112 can be used to generate first and second surface profile data that is comparable to the first and second profile generated by the double-scanner robot 12 by scanning the same girth weld two times with the scanner 140 oriented at the first and second orientations.

Figure 8:
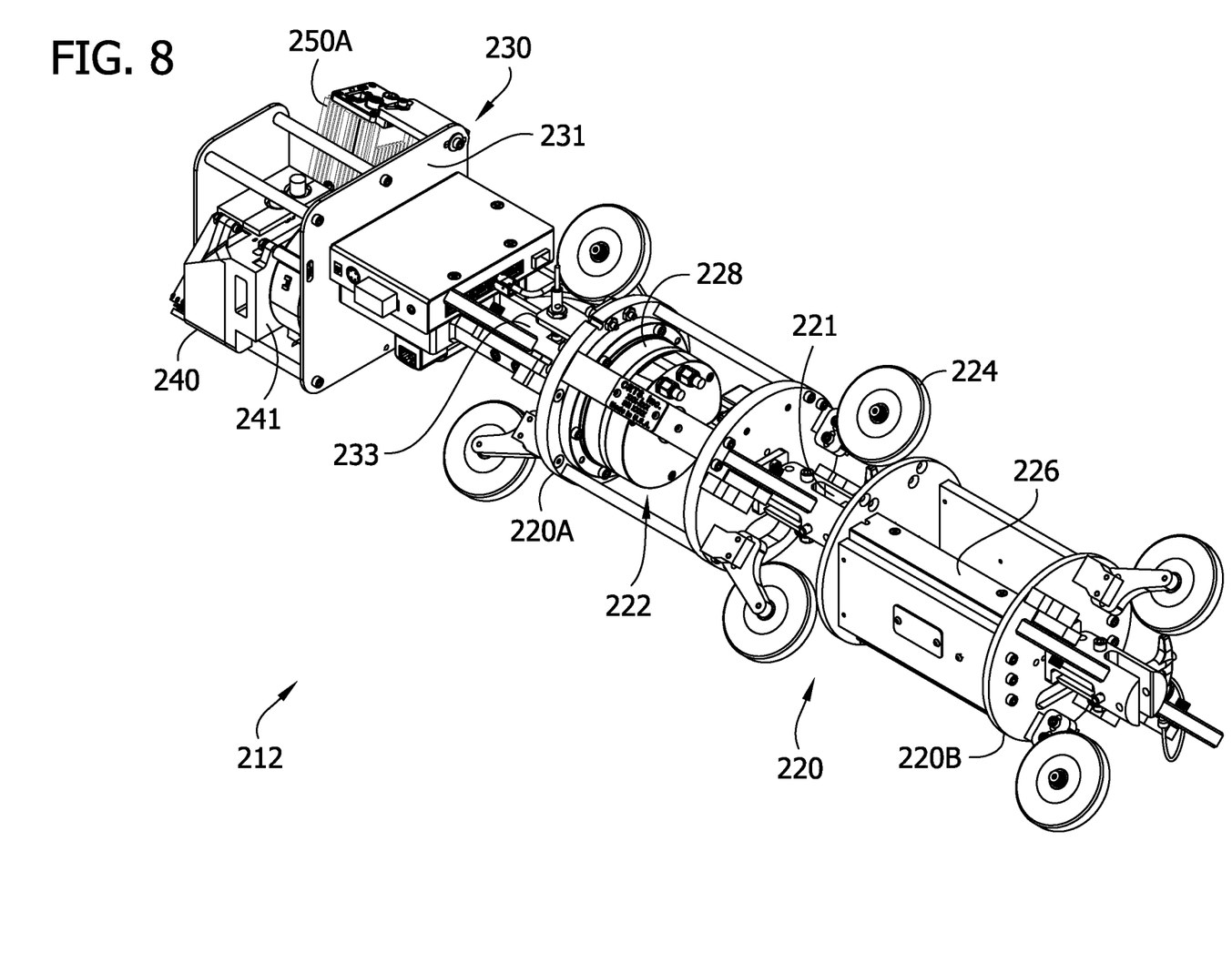
FIG. 8 is a perspective of another embodiment of an inspection robot.
Figure 9:
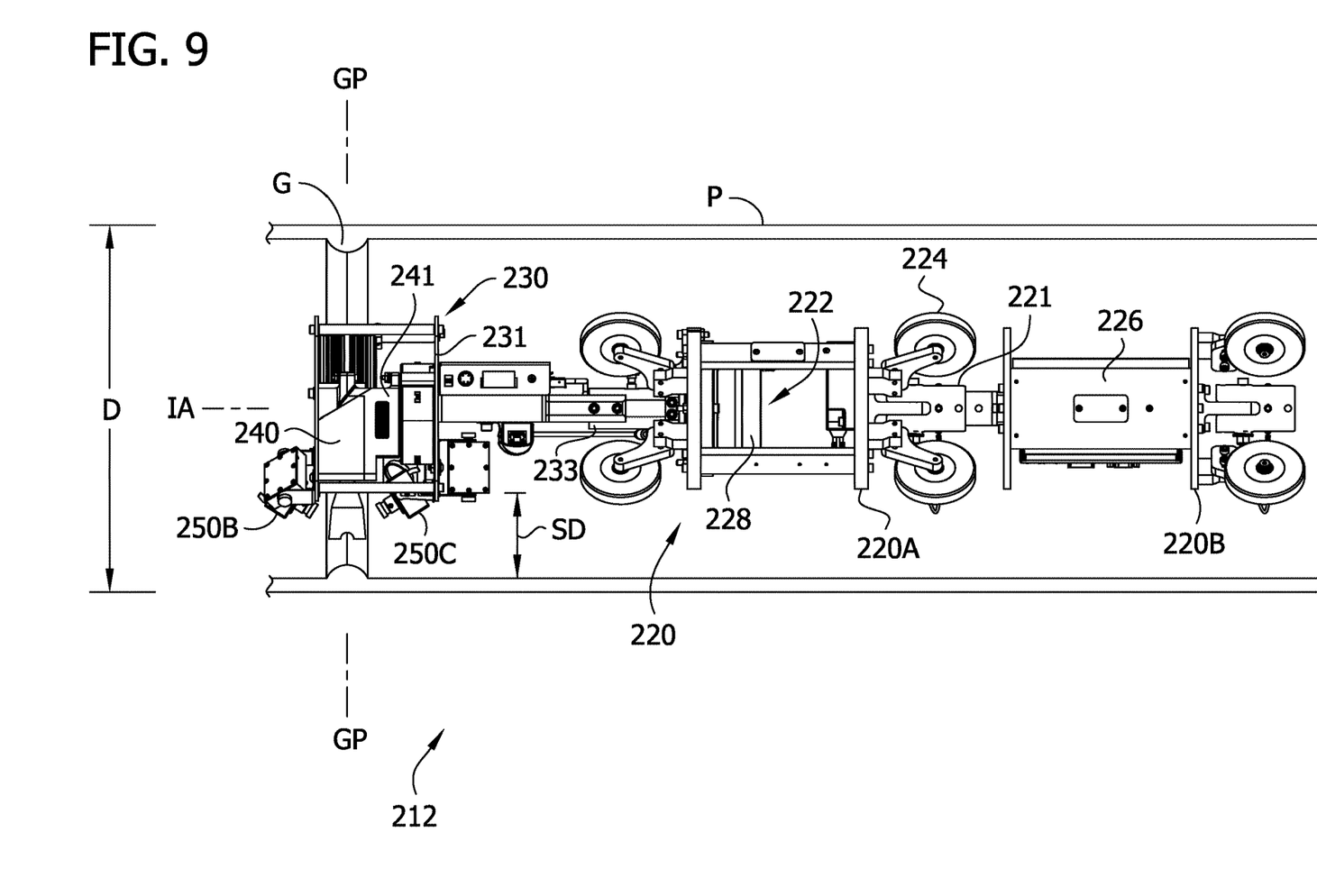
FIG. 9 is a front elevation of the inspection robot of FIG. 8 received in a pipeline.
Figure 10:
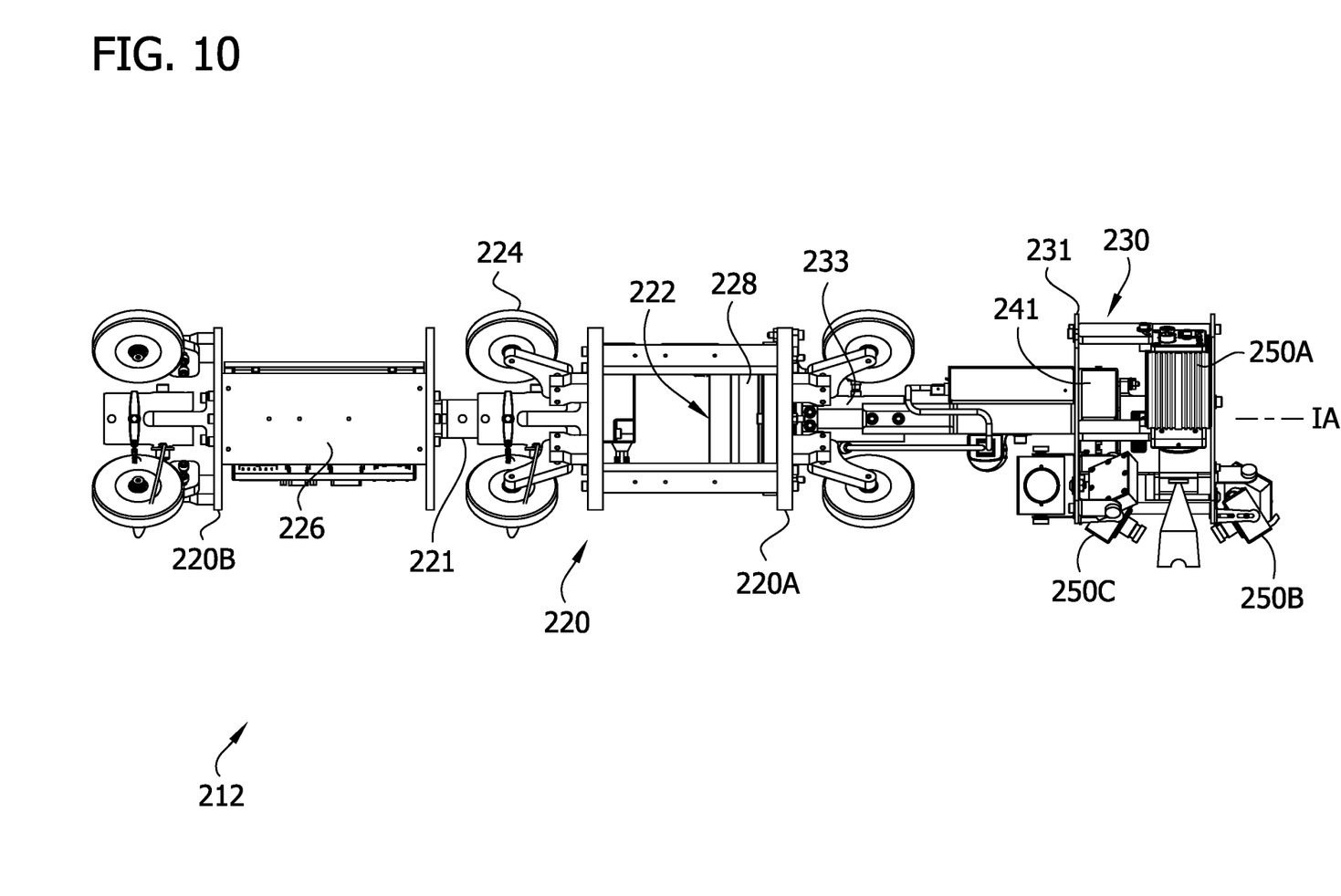
FIG. 10 is a rear elevation of the inspection robot of FIG. 8.

Referring to FIGS. 8-10, another embodiment of an inspection robot is generally indicated at reference number 212. The inspection robot 212 is substantially similar to the inspection robot 12. Like the robot 12, the inspection robot 212 includes a carriage 220 for movement through a pipeline P and an inspection head 230 mounted on the carriage for rotation about an inspection axis IA. The carriage 220 comprises a wheel kit 224 and first and second carriage cars 220A, 220B that are connected by a hitch 221. The carriage 220 includes a drive system 222 for driving rotation of the inspection head 230 about the inspection axis IA. The drive system 222 includes a rotary servo actuator 228 that is mounted on the first carriage car 220A and a servo drive unit 226 that is mounted on the second carriage car 220B. Because the servo actuator 228 and the servo drive unit 226 are mounted on separate, relatively short carriage cars 220A, 220B that are connected by a hitch 221, the carriage 220 is able to navigate bends in a pipeline P that have a relatively small radius of curvature.

The inspection head 230 includes a single laser scanner 240 for generating data representative of the surface profile of a girth weld region and three cameras 250A, 250B, 250C for taking images of the girth weld region. In the illustrated embodiment, the laser scanner 240 is oriented radially of the length of the pipeline, parallel to the girth weld plane GP (FIG. 9). As above, the analyzer 13 can use the surface profile data to evaluate whether the girth weld region G is suitable for accepting a coating and display the images of the girth weld region to a user for more detailed analysis of any location of a girth weld region where a defect is found.

When the robot 212 is operatively positioned in a pipeline P at a girth weld region G, the scanner 240 and cameras 250A, 250B, 250C are oriented toward the same circumferential segment of the girth weld region and the cameras are configured to take images of the circumferential segment of the girth weld region from different orientations. In the illustrated embodiment, one camera 250A comprises a high definition camera that is configured to take images at a higher resolution than the other cameras 250B, 250C. A cooling device 241 is thermally connected to the laser scanner 240 for cooling the laser scanner during use. In the illustrated embodiment, the cooling device 241 comprises a Peltier device and a fan configured to blow air across the Peltier device toward the laser scanner 240. Other robots can use other types of cooling devices without departing form the scope of the invention.

A replaceable mounting plate 231 mounts the inspection head 230 on a drive shaft 233 of the servo drive unit 226. As shown in FIG. 9, the mounting plate 231 is shaped and arranged to position the laser scanner 240 at a radial spacing distance SD from a girth weld region G of a pipeline P of a specified diameter D when the drive shaft 233 extends generally along a center axis of the pipeline. (e.g., the robot is generally centered within the pipeline). For example, in the illustrated embodiment, the mounting plate 231 is configured to mount the inspection head 230 on the drive shaft 233 so that the laser scanner 240 is spaced apart from a girth weld region G of a pipeline P having a diameter D of about ten inches by a spacing distance SD of about 2 inches. Suitably, the robot 212 can be configured to maintain about the same spacing distance SD in pipelines P having other diameters. For example, the robot 212 can include wheel kits (not shown) that are interchangeable with the wheel kit 224 to generally center the inspection head 230 in pipelines P of other diameters D. In addition, the robot 212 can comprise a plurality of mounting plates (not shown) that are interchangeable with the mounting plate 231 for mounting the inspection head 230 on the drive shaft 233 at different radial positions with respect to the driveshaft so that the laser scanner 240 is spaced apart from the girth weld region G of pipelines P of other diameters D at about the same spacing distance SD. It will be understood that the mounting plates could be configured to position the laser scanner 240 at a radial spacing distance SD of other than 2 inches without departing from the scope of the invention.

As can be seen, therefore, the inspection robots 12, 112, 212 provide tools for characterizing the surface profile of girth weld regions G to determine whether the girth weld regions are suitable for being coated. By generating surface profile data, the robots 12, 112, 212 can produce a comprehensive characterization of the weld profile that is capable of identifying surface defects that limit the surface's capability of accepting a coating. Possible defects can be certified based on photos of the girth weld region G and repaired before applying a coating, improving the quality of coatings at the girth weld regions of a pipeline.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

The invention claimed is:
1. A system for inspecting an interior surface of a girth weld region between two pipes of a pipeline, the system comprising:
  a robot comprising:
    a carriage configured for being received in the pipeline for movement along the pipeline; and
    a scanner mounted on the carriage and configured for scanning the interior surface of the girth weld region when the carriage is operatively aligned with the girth weld region and to generate surface profile data representative of a profile of the interior surface of the girth weld region; and
  a profile analyzer configured to receive the surface profile data and to automatically flag based on the received surface profile data any defect in the interior surface of the girth weld region that is greater than a selected size;
  wherein the scanner comprises a non-ultrasonic laser scanner configured to transmit a scanning signal the interior surface of the girth weld region and to receive a reflected surface profile signal from the interior surface of the girth weld region representative of the surface profile
  wherein the robot further comprises an image recording system configured for transmitting images of the interior surface of the girth weld region to the profile analyzer;
  wherein the image recording system includes a plurality of cameras configured to take respective still images of a segment the interior surface of the girth weld region from different orientations and transmit the still images to the profile analyzer;
  wherein the robot includes a head mounted on the carriage for rotation with respect to the carriage about an axis, the scanner and the plurality of cameras being mounted on the head for rotation about the axis;
  wherein, as the head rotates about the axis, the scanner is configured to generate surface profile data at a plurality of circumferentially spaced locations of the girth weld region and the plurality of cameras are configured to take still images of a plurality of circumferentially spaced segments of the girth weld region;
  wherein the profile analyzer is configured to automatically correlate the still images of each of the circumferentially spaced segments of the girth weld region with surface profile data at least at one circumferential location of the girth weld region that is circumferentially aligned with the respective segment whereby the profile analyzer is configured to selectively display the still images of each segment of the girth weld region that includes any defect flagged based on the received surface profile data.

2. A system as set forth in claim 1 wherein the surface profile data includes dimensions of the girth weld region at a plurality of circumferential locations around the pipe.

3. A system as set forth in claim 1 wherein the surface profile data includes an indication of at least one of discontinuities, voids, cracks, holidays, and spatter.

4. A system as set forth in claim 1 wherein the laser scanner comprises a two-dimensional laser scanner configured to generate two-dimensional surface profile data at a plurality of circumferentially spaced locations of the girth weld region as the measurement head rotates about the axis with respect to the carriage.

5. A system as set forth in claim 1 wherein the scanner is configured to generate profile data for the girth weld region at least once every 0.020 circumferential-inches of the girth weld region.

6. A system as set forth in claim 1 further comprising a cooling device thermally coupled to the scanner for cooling the scanner.

7. A system as set forth in claim 1, wherein the selected size is a selectively adjustable dimension defined in a lengthwise unit of measure.

8. A system as set forth in claim 1, wherein the laser scanner constitutes a first laser scanner, the scanner further comprising a second laser scanner, the first and second laser scanner being arranged to scan the interior surface of the girth weld region from different vantages.

9. A system as set forth in claim 1 wherein the profile analyzer is configured to generate a graphic on a display, the graphic including an indication of the location of the flagged defect.

10. A system as set forth in claim 9 wherein the profile analyzer is configured to display the correlated still images of the segment of the interior surface of the girth weld that includes the location of the flagged defect.

11. A system as set forth in claim 1 wherein the robot further comprises a mounting plate for mounting the scanner on the carriage at a radial spacing distance from the girth weld region of the pipeline when the robot is received in the pipeline.

12. A system as set forth in claim 11 wherein the mounting plate comprises a first mounting plate and the pipeline comprises a first pipeline having a first diameter, the system further comprising a second mounting plate that is interchangeable with the first mounting plate and configured for mounting the scanner on the carriage at the radial spacing distance from a girth weld region of a second pipeline having a second diameter when the robot is received in the second pipeline.

13. A system as set forth in claim 1, wherein the plurality of cameras comprises first, second, and third cameras configured to take respective still images of a segment the interior surface of the girth weld region from different orientations.

14. A system as set forth in claim 13, wherein the first camera comprises a high resolution camera that is configured to take images at a higher resolution than the second and third cameras.

15. A system as set forth in claim 14, wherein the first camera is spaced apart between the second and third cameras along the axis.

16. A system for inspecting an interior surface of a girth weld region between two pipes of a pipeline, the system comprising:
  a robot comprising:
    a carriage configured for being received in the pipeline for movement along the pipeline; and
    a scanner mounted on the carriage and configured for scanning the interior surface of the girth weld region when the carriage is operatively aligned with the girth weld region and to generate surface profile data representative of a profile of the interior surface of the girth weld region; and
  a profile analyzer configured to receive the surface profile data and to automatically flag based on the received surface profile data any defect in the interior surface of the girth weld region that is greater than a selected size;

wherein the robot further comprises an image recording system configured for transmitting images of the interior surface of the girth weld region to the profile analyzer;

wherein the image recording system includes a plurality of cameras configured to take respective still images of a segment the interior surface of the girth weld region from different orientations and transmit the still images to the profile analyzer;

wherein the robot includes a head mounted on the carriage for rotation with respect to the carriage about an axis, the scanner and the plurality of cameras being mounted on the head for rotation about the axis;

wherein, as the head rotates about the axis, the scanner is configured to generate surface profile data at a plurality of circumferentially spaced locations of the girth weld region and the plurality of cameras are configured to take still images of a plurality of circumferentially spaced segments of the girth weld region; and wherein the profile analyzer is configured to automatically correlate the still images of each of the circumferentially spaced segments of the girth weld region with surface profile data at least at one circumferential location of the girth weld region that is circumferentially aligned with the respective segment whereby the profile analyzer is configured to selectively display the still images of each segment of the girth weld region that includes any defect flagged based on the received surface profile data.

17. A system as set forth in claim 16 wherein the laser scanner comprises a two-dimensional laser scanner configured to generate two-dimensional surface profile data at a plurality of circumferentially spaced locations of the girth weld region as the measurement head rotates about the axis with respect to the carriage.

18. A system as set forth in claim 16 wherein the scanner is configured to generate profile data for the girth weld region at least once every 0.020 circumferential-inches of the girth weld region.

19. A system as set forth in claim 16 wherein the selected size is a selectively adjustable dimension defined in a lengthwise unit of measure.

20. A system as set forth in claim 16 wherein the profile analyzer is configured to generate a graphic on a display, the graphic including an indication of the location of the flagged defect.

21. A system as set forth in claim 20 wherein the profile analyzer is configured to display the correlated still images of the segment of the interior surface of the girth weld that includes the location of the flagged defect.

22. A system as set forth in claim 16, wherein the plurality of cameras comprises first, second, and third cameras configured to take respective still images of a segment the interior surface of the girth weld region from different orientations.

23. A system as set forth in claim 22, wherein the first camera comprises a high resolution camera that is configured to take images at a higher resolution than the second and third cameras.

24. A system as set forth in claim 23, wherein the first camera is spaced apart between the second and third cameras along the axis.

* * * * *